United States Patent [19]
Valentine et al.

[11] Patent Number: 5,083,129
[45] Date of Patent: Jan. 21, 1992

[54] POLICE RADAR DETECTOR FOR DETECTING RADAR SIGNALS AND DETERMINING THE DIRECTIONAL ORIGIN OF THE SIGNAL SOURCE

[75] Inventors: Michael D. Valentine; Clarence R. Groth; Stephen R. Scholl; Marwan E. Nusair, all of Cincinnati, Ohio

[73] Assignee: Valentine Research, Inc., Cincinnati, Ohio

[21] Appl. No.: 659,625

[22] Filed: Feb. 25, 1991

[51] Int. Cl.⁵ .............................................. G01S 7/40
[52] U.S. Cl. ..................................................... 342/20
[58] Field of Search ................... 342/20; 455/227, 345

[56] References Cited

U.S. PATENT DOCUMENTS

| | | |
|---|---|---|
| 3,660,844 | 5/1972 | Potter . |
| 3,956,749 | 5/1976 | Magorian . |
| 4,182,990 | 1/1980 | Coffin et al. . |
| 4,315,261 | 2/1982 | Mosher . |
| 4,404,561 | 9/1983 | Malder et al. . |
| 4,613,989 | 9/1986 | Fende et al. . |
| 4,622,553 | 11/1986 | Baba et al. . |
| 4,626,857 | 12/1986 | Imazeki . |
| 4,630,054 | 12/1986 | Martinson . |
| 4,633,521 | 12/1986 | Liautaud . |
| 4,668,952 | 5/1987 | Imazeki et al. . |
| 4,686,499 | 8/1987 | Furnish . |
| 4,692,763 | 9/1987 | Gregg, Jr. . |
| 4,700,191 | 10/1987 | Manor . |
| 4,719,462 | 1/1988 | Hawkins . |
| 4,725,840 | 2/1988 | Orazietti . |
| 4,750,215 | 6/1988 | Biggs . |
| 4,949,088 | 8/1990 | Ryan et al. . |
| 5,001,777 | 3/1991 | Liautaud .......................... 342/20 X |

OTHER PUBLICATIONS

New Snooper System Radar Detectors Advertisement, Sonaradar Advertisement.
Find the Hidden Radar Detector, Car and Driver, Mar., 1985, Csaba Csere and Don Sherman.
"Microwave Passive Direction Finding", A Wiley-Interscience Publication, Steven E. Lipsky, 1987.

Primary Examiner—Mark Hellner
Attorney, Agent, or Firm—Killworth, Gottman, Hagan & Schaeff

[57] ABSTRACT

A police radar detector detects both the presence of radar signals incident upon a motor vehicle using the detector and also determines the direction of origin of the source of detected radar signals and signals the operator of the motor vehicle of the presence and source direction of the radar signals. Preferably, the radar detector includes two antennas with shared circuitry in a single housing. One of the antennas is directed generally toward the front of the motor vehicle and the other antenna is directed generally to the rear of the motor vehicle. As the police speed radar frequency bands are scanned or swept, each potential radar signal which is detected is processed to determine the direction of origin of the signals. To determine the direction of origin of incident radar signals, the signals are detected in both antennas with the signal strengths in the two antennas being compared to determine the direction of origin of the signals. It is preferred to identify the direction of the radar source as being to the front of the vehicle, to the rear of the vehicle or to the side of the vehicle. Empirically determined tables assist in the determination of thresholds for use in the detector to determine direction of the source of detected radar signals.

10 Claims, 3 Drawing Sheets

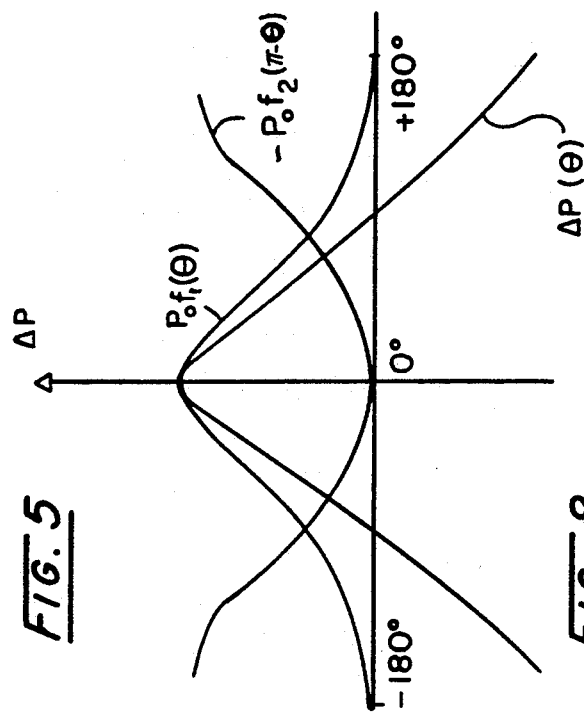
FIG. 5
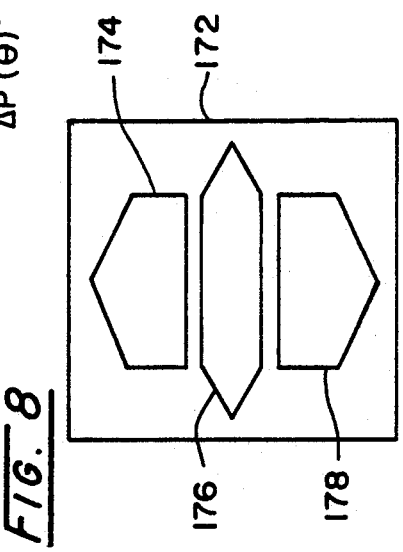
FIG. 8
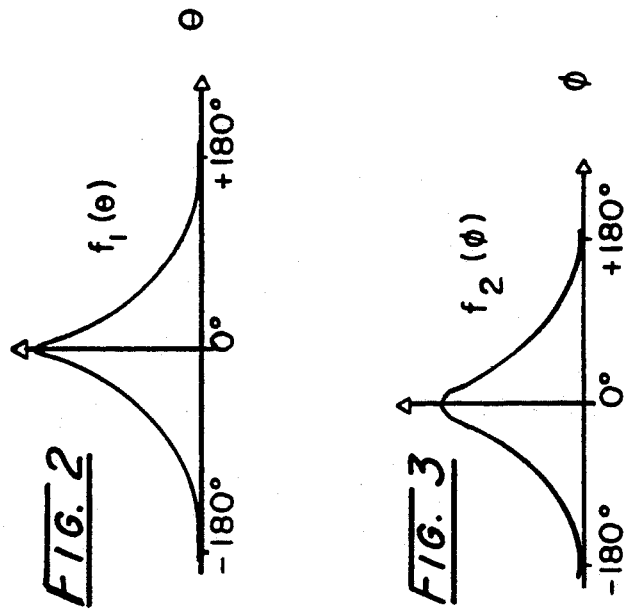
FIG. 2
FIG. 3
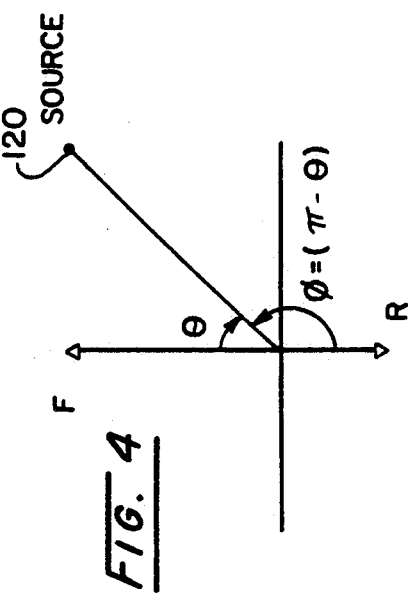
FIG. 4

| ANGLE θ | ΔP (dB) |
|---|---|
| 0° | 30.2 |
| 10° | 29.6 |
| 20° | 28.0 |
| 30° | 25.7 |
| 40° | 23.1 |
| 50° | 20.1 |
| 60° | 16.4 |
| 70° | 10.5 |
| 80° | 6.6 |
| 90° | -4.5 |
| 100° | -15.7 |
| 110° | -19.7 |
| 120° | -20.0 |
| 130° | -22.1 |
| 140° | -24.8 |
| 150° | -26.5 |
| 160° | -27.6 |
| 170° | -28.1 |
| 180° | -28.1 |

FRONT
TH1
SIDE
TH2
REAR

POLICE RADAR DETECTOR FOR DETECTING RADAR SIGNALS AND DETERMINING THE DIRECTIONAL ORIGIN OF THE SIGNAL SOURCE

BACKGROUND OF THE INVENTION

The present invention relates generally to police radar detectors used in motor vehicles and, more particularly, to a police radar detector which not only detects the presence of radar signals incident on a motor vehicle but also determines the direction of the source of the radar signals and alerts the operator of the motor vehicle of both radar signal presence and source direction.

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals and the relative field strength of detected signals. The widely varying operating procedures for using police radar and the proliferation of other signals assigned to the same frequency bands as police radar has led to the need for police radar detectors which give more information than that provided by current radar detectors.

For example, police radar units are often deployed along the side of the roadway, to measure a motor vehicle's speed as it advances toward the unit. In some instances, the police radar may measure the speed of a motor vehicle after it has passed and is travelling away from the unit. Police vehicles may also be equipped with radar units which are operated while the police vehicles are moving, using reflections from stationary objects to measure the speed of the police vehicle itself, and reflections from a target vehicle to measure relative speed, and using both measured speeds to determine the actual speed of the target vehicle.

When a vehicle equipped with a radar detector is within microwave range of a police radar unit which transmits a radar signal, the detector alerts the vehicle operator that the signal is present typically through a combination of audible and visual signals. As the user approaches the source of the radar signal, signal strength normally indicated by the typical detector increases. As the vehicle passes the source of the radar signal, the indicated signal strength drops, usually very quickly, since a forwardly aimed directional antenna of the detector is no longer pointed in the general direction of the signal source, and is now responding to reflections of the signal from objects in front of the vehicle. If the police radar unit is at the side of the road in a clearly visible location, the vehicle operator can easily correlate the detected signal and its apparent source.

If, on the other hand, the police radar unit is not visible, for example because it is in an unmarked car, it is dark, or the radar signal source is actually on a different nearby roadway not visible to the vehicle operator, the source of the radar signal cannot readily be determined. Further, under such conditions, when the detector indicates a drop in signal strength apparently indicating that the vehicle has passed a radar source, the vehicle operator cannot be sure whether the source is now behind the vehicle or if the drop in signal strength is due to terrain changes caused by movement of the vehicle.

In addition to the possible variations in police radar signal encounters, there are many different sources of microwave signals in the frequency bands allocated to police radar by the U.S. Federal Communications Commission (FCC) since these bands have also been allocated for transmitters performing other functions. For example, motion-detecting burglar alarms, automatic door openers, and low-power speed measuring devices used in sports also operate in the frequency bands allocated to police radar. Unfortunately, police radar detectors cannot distinguish between signals generated by a police radar transmitter and those generated by other devices which utilize microwave signals within the same frequency bands. The inability to distinguish these signals is a disadvantage of police radar detectors, particularly in urban areas where the number of non-police microwave signals may be relatively high.

Accordingly, there is a need for an improved police radar detector which can assist the operator of a motor vehicle using the detector to accurately interpret signals generated by the detector to alert the operator of police radar signals incident on the motor vehicle.

SUMMARY OF THE INVENTION

This need is met by the police radar detector of the present invention which not only detects the presence of radar signals incident upon a motor vehicle using the detector but also determines the direction of origin of the source of detected radar signals. The radar detector of the present invention then signals the operator of the motor vehicle of the presence of radar signals and also informs the operator of the direction from which the signals are coming to assist the operator in evaluating the signals. In the preferred form of the invention, the radar detector includes two antennas in a single housing with the signals from the two antennas being processed by the same circuitry which is shared by the antennas. Preferably, one of the antennas is directed generally toward the front of the motor vehicle with the other antenna being directed generally to the rear of the motor vehicle. As the relevant frequency bands which correspond to police speed monitoring radar are scanned or swept, each potential radar signal which is detected is processed to determine the direction of origin of the signals. To determine the direction of origin of incident radar signals, the signals are detected in both antennas with the signal strengths in the two antennas being used to determine the direction of origin of the signals. The direction of origin can be resolved to some precision; however, it is preferred to identify the direction of the radar source as being to the front of the vehicle, to the rear of the vehicle or to the side of the vehicle. Empirically derived tables set thresholds for the determination of radar source directions.

In accordance with one aspect of the present invention, a motor vehicle radar signal detector for alerting an operator of a motor vehicle to incoming radar signals comprises receiver means comprising a first antenna aimed in a first direction relative to the motor vehicle and a second antenna aimed in a second direction relative to the motor vehicle, the second direction being different from the first direction. The two antennas receive incoming radar signals at frequencies within at least one frequency band corresponding to police speed monitoring radar. Incoming radar signal detector means are provided for generating radar identification signals which identify incoming radar signals. Connector means provide for connecting signals from the receiver means to the radar signal detector means. Processor means control the connector means to selectively connect signals from the first and second antennas to the radar signal detector means. The processor means is responsive to radar identification signals generated by the detector means for identifying radar signals coming from the first direction relative to the motor vehicle and radar signals coming from the second direction relative to the motor vehicle. The processor means also generates direction signals identifying the direction of origin of incoming radar signals. Alarm means are provided for alerting an operator of a motor vehicle utilizing the detector of incoming radar signals, the alarm means includes direction indicating means responsive to the direction signals for identifying whether the identified radar signals are coming from the first direction or are coming from the second direction.

Preferably, the first direction is generally to the front of the motor vehicle, the second direction is generally to the rear of the motor vehicle and the at least one intermediate direction is to a side of the motor vehicle.

In accordance with another aspect of the present invention, a motor vehicle radar signal detector for alerting an operator of a motor vehicle to incoming radar signals comprises receiver means comprising a generally forwardly directed first antenna and a generally rearwardly directed second antenna for receiving incoming radar signals at frequencies within at least one frequency band. Detector means are provided for generating radar identification signals which identify incoming radar signals and connector means connects signals from the receiver means to the detector means. Processor means is provided for controlling the connector means to selectively connect signals from the first and second antennas to the detector means. The processor means is responsive to radar identification signals generated by the detector means to identify radar signals coming from in front of the motor vehicle and radar signals coming from behind the motor vehicle, and to generate direction signals identifying the direction of origin of incoming radar signals. Alarm means are provided for alerting an operator of a motor vehicle utilizing the detector upon identification of incoming radar signals. The alarm means includes direction indicating means responsive to the direction signals for identifying whether the identified radar signals are coming from in front of the motor vehicle or are coming from behind the motor vehicle.

Preferably, the first and second antennas are positioned within a single housing for the motor vehicle radar signal detector of the present invention. The radar identification signals indicate the strengths of signals in the first and second antennas and the processor means is responsive to the signal strengths to determine whether signals are incident on the motor vehicle from the front, back or side of the vehicle. The alarm means further includes means for identifying whether the identified radar signals are coming from the side of the motor vehicle. Since the primary threat is to the front of the vehicle, the portion of time that signals from the first antenna are applied to the detector means to detect radar signals coming from in front of the motor vehicle is greater than the portion of time that signals from the second antenna are applied to the detector means to detect radar signals coming from the rear of the motor vehicle.

In accordance with yet another aspect of the present invention, a method of operating a motor vehicle radar signal detector for alerting an operator of a motor vehicle to incoming radar signals comprises the steps of: detecting radar signals within at least one frequency band which are incident on the motor vehicle from a first direction; detecting radar signals within at least one frequency band which are incident on the motor vehicle from a second direction; and, alerting the operator of the motor vehicle of the presence and incident direction of detected radar signals.

In accordance with still another aspect of the present invention, a method of operating a motor vehicle radar signal detector for alerting an operator of a motor vehicle to incoming radar signals comprises the steps of: sensing radar signals received by a first antenna which is aimed in a first direction; sensing radar signals received by a second antenna which is aimed in a second direction different from the first direction; activating first alarm means in response to sensed incoming radar signals received by the first antenna; and, activating second alarm means in response to sensed incoming radar signals received by the second antenna whereby the operator of the motor vehicle is alerted to the presence and direction of origin of sensed radar signals.

Preferably the method further comprises the steps of: determining the strength of sensed radar signals received by the first antenna; determining the strength of sensed radar signals received by the second antenna; comparing the strength of the same sensed radar signal as received in the first and second antennas to determine whether the same sensed radar signal is incident on the motor vehicle primarily from the first direction, primarily from the second direction or primarily from an intermediate direction between the first and second directions; and, activating third alarm means in response to sensed incoming signals incident on the motor vehicle primarily from an intermediate direction to alert the operator of the motor vehicle of the presence of such signals.

It is thus an object of the present invention to provide an improved police radar detector which provides additional information to the user of the detector to assist the operator in interpreting and responding to detected radar signals; to provide an improved police radar detector which provides additional information to the user of the radar detector by incorporating two antennas directed in different directions into a single housing with circuitry shared by the antennas for detecting radar signals and alerting an operator of radar signals originating from one of the two directions; and, to provide an improved police radar detector which provides additional information to the user of the radar detector wherein signals received by two differently directed antennas are compared to one another to determine the direction of the radar source relative to the motor vehicle making use of the detector and alerting an operator of the presence and direction of origin of the signals.

Other objects and advantages of the invention will be apparent from the following description, the accompanying drawings and the appended claims.

BRIEF DESCRIPTION OF THE DRAWINGS

FIG. 2 is a graph of an antenna pattern function $f_1(\Theta)$ for one of the frequency bands of the forwardly directed antenna of FIG. 1;

FIG. 3 is a graph of an antenna pattern function $f_2(\phi)$ for one of the frequency bands of the rearwardly directed antenna of FIG. 1;

FIG. 4 is a graph of a radar source oriented at an angle $\Theta$ relative to the forward direction of a vehicle and at an angle $\phi$, $(\pi-\Theta)$, relative to the rear direction of the vehicle;

FIG. 5 is a graphic overlay of the functions $\Delta P(\Theta)$, $P_0 f_1(\Theta)$ and $P_0 f_2(\pi-\Theta)$ illustrating the difference between the weighted powers of the signals received by the front and rear antennas of FIG. 1;

FIG. 8 is an elevational view of a three directional display for use in the present invention.

DETAILED DESCRIPTION OF THE INVENTION

As previously noted, the present invention relates to a motor vehicle radar detector which not only detects the presence of radar signals incident on a motor vehicle but also determines the direction of the source of the radar signals and alerts the operator of the motor vehicle of both the presence of radar signals and the source direction or angular orientation of the source relative to the motor vehicle.

Figure 1:
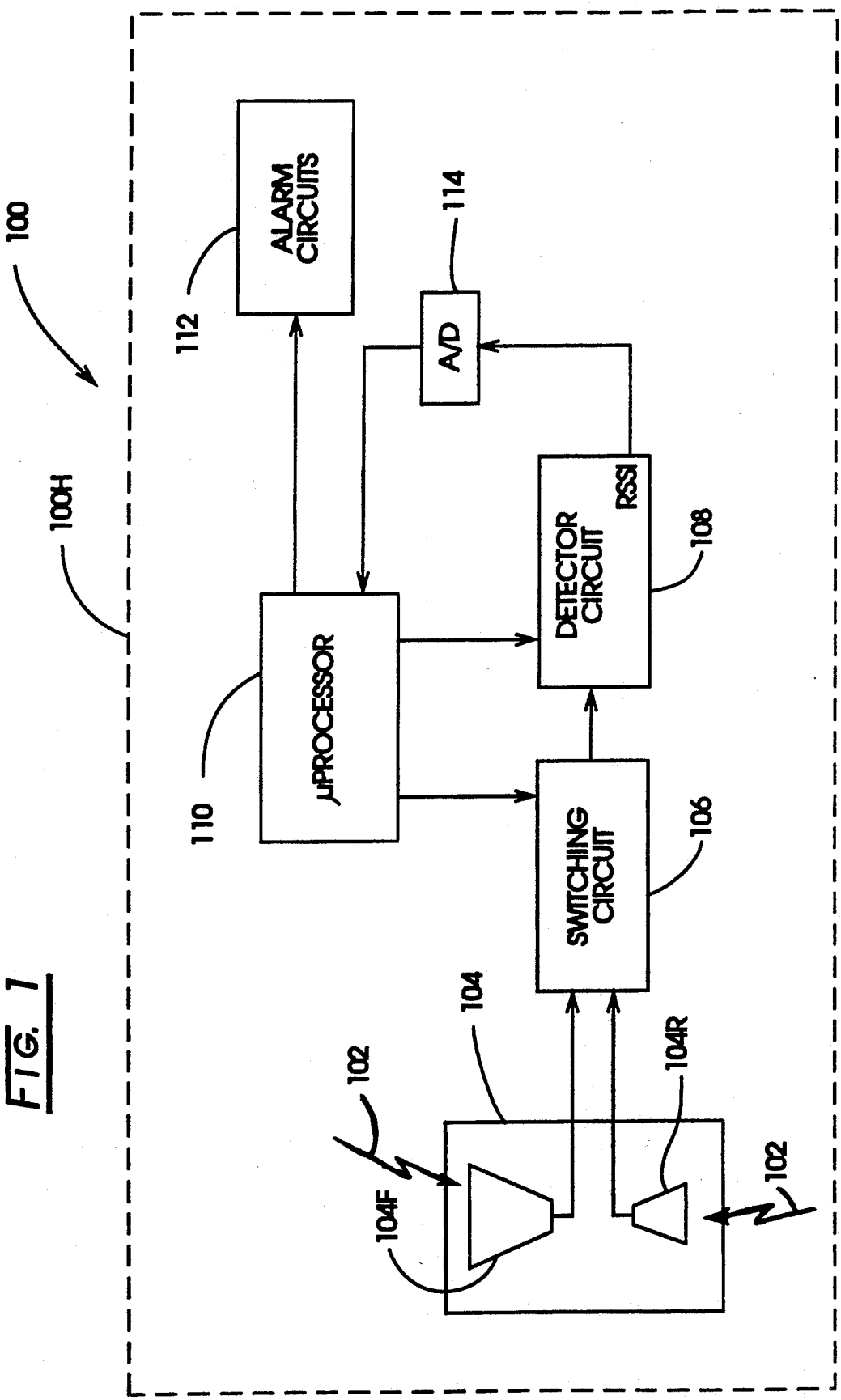
FIG. 1 is a schematic block diagram of a radar detector in accordance with the present invention.

The radar detector 100 of FIG. 1 monitors one or more police radar bands to sense radar signals 102 incident upon receiver means comprising antennas 104, a generally forwardly directed antenna 104F and a generally rearwardly directed antenna 104R, of the detector 100. While the antennas 104F, 104R are illustrated as generally facing the front and the rear of a vehicle including the detector 100, it is to be understood that the antenna directions can be different for given applications and as a result of existing or future requirements. Signals received by the antennas 104F, 104R are passed to connector means comprising a switching circuit 106 in the illustrated embodiment for connecting signals from the antennas 104F, 104R to detector means which provides for generating radar identification signals identifying incoming radar signals.

In the illustrated embodiment of FIG. 1, the detector means comprises any appropriate radar detector circuit 108 capable of generating a received signal strength indicator (RSSI) output signal which indicates the signal strength of radar signals detected by the detector circuit 108. The switching circuit 106 and radar detector circuit 108 are not important to the invention of the present application, can take a wide variety of forms and can include amplifiers, mixers, diplexers, and other circuitry commonly used in the radar detector field as are well known to those skilled in the art. Accordingly, the switching circuit 106 and the radar detector 108 will not be further described herein.

Processor means taking the form of a microprocessor 110 in the illustrated embodiment control the switching circuit 106 to selectively connect signals from the antennas 104F and 104R to the detector circuit 108. Operation and control of the detector circuit 108, for example for the detection of radar signals in different frequency bands allocated to police radar signals, is also performed by the microprocessor 110. The microprocessor 110 additionally controls alarm circuits 112 to communicate information regarding detected radar signals to the operator of a motor vehicle utilizing the detector 100 by means of one or more alarm tones and/or visual indicators which are included within the alarm circuits 112. As shown in FIG. 1, the antennas 104F and 104R are preferably positioned within a single housing which can be the radar detector housing 100H, schematically represented by the dotted line box of FIG. 1.

The determination of the direction of the source of radar signals incident on a motor vehicle in accordance with the present invention will now be described with reference to FIGS. 2–8. FIG. 2 is a graphic representation of an antenna pattern function $f_1(\Theta)$ for one of the frequency bands of the forwardly directed antenna 104F where $\Theta$ represents the incident angle relative to the forward direction of the motor vehicle utilizing the radar detector 100. Similarly, FIG. 3 is a graphic representation of an antenna pattern function $f_2(\phi)$ for the same frequency band of the rearwardly directed antenna 104R where $\phi$ represents the incident angle relative to the rear direction of the motor vehicle utilizing the radar detector 100 with $\phi$ equalling $(\pi-\Theta)$. Thus, as shown in FIG. 4, a radar source 120 is oriented at an angle $\Theta$ relative to the forward direction F of the vehicle and at an angle $\phi$ $(\pi-\Theta)$, relative to the rear direction R of the vehicle.

FIG. 5 is a graphic overlay representing the functions $\Delta P(\Theta)$, $P_0 f_1(\Theta)$ and $P_0 f_2(\pi-\Theta)$ wherein $\Delta P(\Theta)$ is the difference between the weighted power of the signal received in the forwardly directed antenna 104F, $P_0 f_1(\Theta)$, and the power of the signal received in the rearwardly directed antenna 104R, $P_0 f_2(\pi-\Theta)$, thus:

$$\Delta P(\Theta) = P_0 f_1(\Theta) - P_0 f_2(\pi - \Theta).$$

Figure 6:
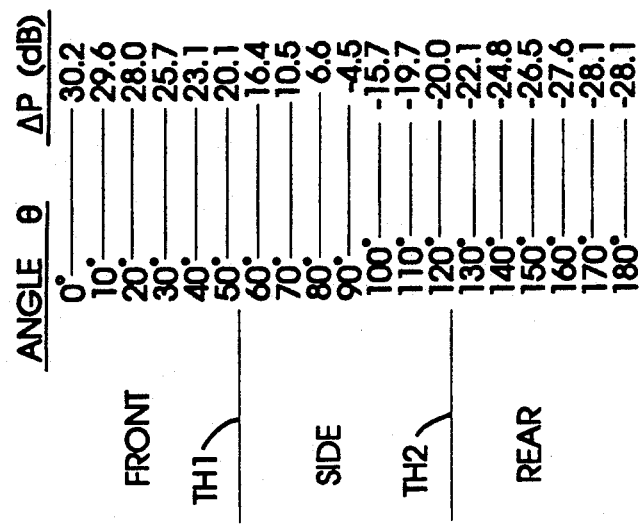
FIG. 6 is an empirically determined table for determining the angular orientation of a radar source relative to a vehicle utilizing the radar detector of the present invention.

As can be seen from FIG. 5, $\Delta P(\Theta)$ is symmetric with respect to $\pm\Theta$ and is monotonic for $0 \leq \Theta \leq \pi$. In practice, a table is prepared for each band to be monitored, for example as shown in FIG. 6 wherein $\Delta P(\Theta)$, listed in decibels (dB), has been determined for every 10° of the source angle $\Theta$. Once the specific forwardly directed antenna 104F and the rearwardly directed antenna 104R have been selected for use in the detector 100, the table of FIG. 6 is prepared empirically by physically positioning a unit fixed power source at the frequency of interest at the corresponding angular positions and recording the power received by the antennas 104F and 104R. A different table is used for each frequency band since the antenna patterns are quite different for the different frequency bands which are allocated for police radar. If multiple bands are monitored, as is typically the case, weighting of the signals received in the different bands may be performed to approximately equalize the effective signal levels for corresponding power level sources in the different frequency bands. Such weighting is inherent in the tables which are empirically generated for a given pair of antennas 104F, 104R.

Figure 7:
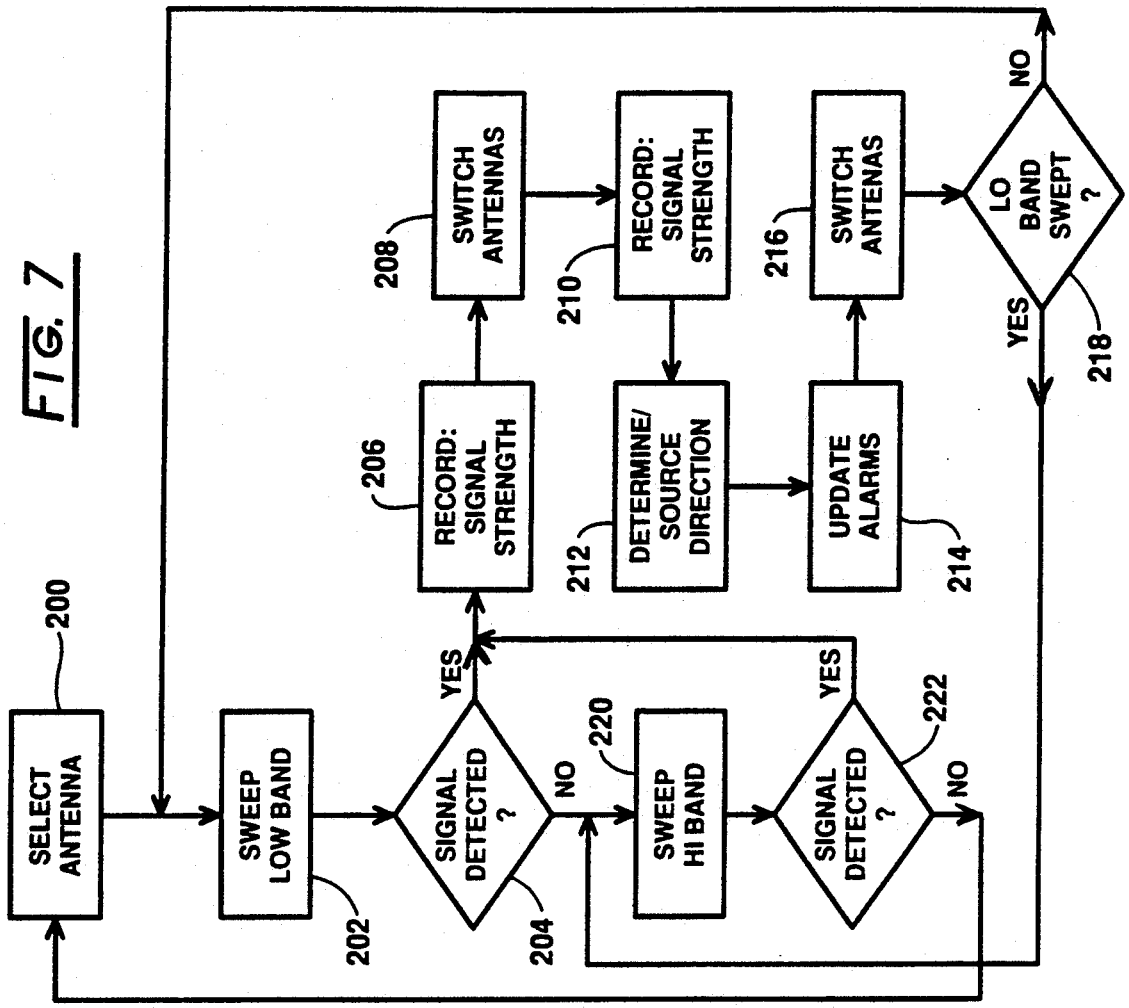
FIG. 7 is a flow chart of the operations of the radar detector of the present invention in determining the angular orientation of a radar source relative to a vehicle utilizing the radar detector of the present invention.

Operation of the directional police radar detector 100 of the present invention will now be described with reference to the flow chart of FIG. 7. While the detector circuit 108 can be used to monitor or sweep only one or any reasonable number of frequency bands (four frequency bands are commonly swept in state-of-the-art police radar detectors), it will be described as monitoring or sweeping at least two frequency bands, one frequency band in the lower range of frequencies allocated to police radar detectors (LO BAND) and one frequency band in the upper range of frequencies allocated to police radar detectors (HI BAND). The microprocessor 110 initially selects the antenna 104F or 104R the signals from which are first to be connected to the radar detector circuit 108 and used for the current sweep, see block 200. As previously noted, the forwardly directed antenna 104F is selected more often than the rearwardly directed antenna 104R due to the greater threat in front of a vehicle and the relatively quicker closing speeds. In any event, after one of the antennas 104F or 104R is selected, the low band is swept in a conventional manner, see block 202.

If any radar signals are detected, see block 204, the strength of the signals is recorded by the microprocessor 110, see block 206. In the present invention, output signals from an analog to digital (A/D) converter 114, which are connected to the microprocessor 110, are utilized as the signal strength since the digital signals are easily processed and stored by the microprocessor 110. The frequencies of detected signals are maintained in the present invention for signal direction processing by the microprocessor 110 which stops the detector circuit 108 upon initial signal detection.

As soon as a signal has been detected and the detector circuit 108 stopped, the selection of the antennas 104 is switched and the same signal is detected for the other antenna, see block 208. The signal strength of the signal in the other antenna is recorded, see block 210. At this point, a radar signal will have been detected, the strength of the signal in both antennas 104F and 104R will have been determined and recorded by the microprocessor 110. The microprocessor 110 next determines the angular direction of the source 120 from the motor vehicle utilizing the radar detector 100, see block 212. The determination of the direction of the detected radar source can be performed by table look-up using the appropriate table for the band including the detected radar signal and the signal strengths of the signal in the antennas 104F and 104R. While it would be possible to precisely identify the angular direction of the radar source 120, for the motor vehicle radar detector 100 of the present invention, identification of one of three directions appears to be adequate for the operator of a motor vehicle including the detector 100: front, side or rear.

Thus, as shown in FIG. 6, it is possible to select upper and lower thresholds TH1 and TH2 with the direction of the radar source 120 being identified as: from the front if the power difference $\Delta P(\Theta)$ exceeds the upper threshold TH1; from the rear if the power difference $\Delta P(\Theta)$ is below the lower threshold TH2; and, from the side if the power difference $\Delta P(\Theta)$ is equal to or between the upper threshold TH1 and the lower threshold TH2. As shown in FIG. 6, the thresholds TH1 and TH2 correspond approximately to $+20$ db and $-20$ db, respectively which corresponds to approximately 0°-50° front, 50°-120° side, and 120°-180° rear. Of course the precise selections of the designations of front, side and rear depend upon user comfort and will ultimately be determined during field testing of the detector 100. The actual designations of front, side and rear can be programmed into the microprocessor 110 and may even be made selectable if deemed desirable from a user's standpoint.

The alarms are next updated based on the preceding determinations, see block 214. In addition to an audible indication of a detected radar signal, a visual indication will be given to the operator which visual indication will indicate the identified direction of the radar source 120. For example, as shown in FIG. 8 a three element visual display 172 will be provided. For a radar source identified as being in front of the vehicle, an upward or forwardly directed arrow indicator 174 will be lighted; for a radar source identified as being to the side of the vehicle, a double-ended, sidewardly directed arrow indicator 176 will be lighted; and, for a radar source identified as being to the rear of the vehicle, a downwardly or rearwardly directed arrow indicator 178 will be lighted.

The antennas 104 are then switched again to restore the radar detector to receive signals from the antenna from which it was receiving signals when a signal was detected, see block 216. If the low band was being swept and was not completely swept, the sweep of the low band continues from where the sweep was interrupted, see block 218. If the low band was completely swept or the high band was being swept, the sweep of the high band commences or is continued from where it was interrupted, see block 220. Any radar signals which are detected during the sweep of the high band are handled in the manner just described for the low band. After the low band and high band have been swept, the microprocessor 110 is returned to the point where it once again selects the antenna to be used for the next sweeping operation, see blocks 222 and 200, respectively. It should be apparent that the detector 100 can be used to monitor or sweep a single frequency band or any reasonable number of frequency bands which have been allocated to police radar.

Having thus described the police radar detector identifying angular direction of radar sources of the present invention in detail and by reference to preferred embodiments thereof, it will be apparent that modifications and variations are possible without departing from the scope of the invention defined in the appended claims.

What is claimed is:

1. A motor vehicle radar signal detector for alerting an operator of a motor vehicle to incoming radar signals, said detector comprising:

receiver means comprising a first antenna aimed in a first direction relative to said motor vehicle and a second antenna aimed in a second direction relative to said motor vehicle and different from said first direction for receiving incoming radar signals at frequencies within at least one frequency band;

radar signal detector means for generating radar identification signals which identify incoming radar signals;

connector means for connecting signals from said receiver means to said radar signal detector means;

processor means for controlling said connector means to selectively connect signals from said first and second antennas to said radar signal detector means and responsive to radar identification signals generated by said radar signal detector means to identify radar signals coming from said first direction relative to said motor vehicle and radar signals coming from said second direction relative to said motor vehicle, and to generate direction signals identifying the direction of origin of incoming radar signals; and alarm means for alerting an operator of a motor vehicle upon identification of incoming radar signals, said alarm means including direction indicating means responsive to said direction signals for identifying whether the identified radar signals are coming from said first direction or are coming from said second direction.

2. A motor vehicle radar signal detector for alerting an operator of a motor vehicle to incoming radar signals as claimed in claim 1 wherein said first and second antennas are positioned within a single housing for said motor vehicle radar signal detector.

3. A motor vehicle radar signal detector for alerting an operator of a motor vehicle to incoming radar signals as claimed in claim 1 wherein said radar identification signals indicate the strengths of identified radar signals and said processor means is responsive to the strengths of the signals received by said first and second antennas to determine whether signals are incident on said motor vehicle from said first direction, from said second direction or from a direction intermediate said first and second directions, said alarm means further including means for identifying whether the identified radar signals are coming from at least one intermediate direction.

4. A motor vehicle radar signal detector for alerting an operator of a motor vehicle to incoming radar signals as claimed in claim 3 wherein said first direction is generally to the front of said motor vehicle and said second direction is generally to the rear of said motor vehicle.

5. A motor vehicle radar signal detector for alerting an operator of a motor vehicle to incoming radar signals as claimed in claim 4 wherein said at least one intermediate direction is to a side of said motor vehicle.

6. A motor vehicle radar signal detector for alerting an operator of a motor vehicle to incoming radar signals, said detector comprising:

receiver means comprising a generally forwardly directed first antenna and a generally rearwardly directed second antenna of receiving incoming radar signals at frequencies within at least one frequency band;

detector means for generating radar identification signals which identify incoming radar signals;

connector means for connecting signals from said receiver means to said detector means;

processor means for controlling said connector means to selectively connect signals from said first and second antennas to said detector means and responsive to radar identification signals generated by said detector means to identify radar signals coming from in front of said motor vehicle and radar signals coming from behind said motor vehicle, and to generate direction signals identifying the direction of origin of incoming radar signals; and alarm means for alerting an operator of a motor vehicle upon identification of incoming radar signals, said alarm means including direction indicating means responsive to said direction signals for identifying whether the identified radar signals are coming from in front of said motor vehicle or are coming from behind said motor vehicle.

7. A motor vehicle radar signal detector for alerting an operator of a motor vehicle to incoming radar signals as claimed in claim 6 wherein said first and second antennas are positioned within a single housing for said motor vehicle radar signal detector.

8. A motor vehicle radar signal detector for alerting an operator of a motor vehicle to incoming radar signals as claimed in claim 6 wherein said radar identification signals indicate the strengths of signals received by said first and second antennas and said processor means further provides for determining whether signals are incident on said motor vehicle form the front, back or side thereof in response to the strengths of signals received by said first and second antennas, said alarm means further including means for identifying whether the identified radar signals are coming from the side of said motor vehicle.

9. A motor vehicle radar signal detector for alerting an operator of a motor vehicle to incoming radar signals as claimed in claim 8 wherein the portion of time that signals from said first antenna are applied to said detector means to detect radar signals coming from in front of said motor vehicle is greater than the portion of time that signals from said second antenna are applied to said detector means to detect radar signals coming form behind said motor vehicle.

10. A method of operating a motor vehicle radar signal detector for alerting an operator of a motor vehicle to incoming radar signals, said method comprising the steps of:

sensing radar signals received by a first antenna which is aimed in a first direction;

sensing radar signals received by a second antenna which is aimed in a second direction different from said first direction;

determining the strength of sensed radar signals received by said first antenna;

determining the strength of sensed radar signals received by said second antenna;

comparing the strength of the same sensed radar signal as received in said first and second antennas to determine whether said same sensed radar signal is incident on said motor vehicle primarily form said first direction, primarily from said second direction or primarily from an intermediate direction between said first and second directions;

activating first alarm means in response to sensed incoming radar signals incident primarily form said first direction;

activating second alarm means in response to sensed incoming radar signals incident primarily form said second direction; and activating third alarm means in response sensed incoming signals incident on said motor vehicle primarily from an intermediate direction whereby the operator of said motor vehicle is alerted to the presence and direction of origin of sensed radar signals.

* * * * *

UNITED STATES PATENT AND TRADEMARK OFFICE
CERTIFICATE OF CORRECTION

PATENT NO. : 5,083,129
DATED : 1/21/92
INVENTOR(S) : Michael D. Valentine et al It is certified that error appears in the above-identified patent and that said Letters Patent is hereby corrected as shown below:

Col. 10, line 12, "form the front" should be --from the front--.
Col. 10, line 25, "form behind" should be --from behind--.
Col. 10, line 43, "primarily form" should be --primarily from--.
Col. 10, line 46, "primarily form" should be --primarily from--.
Col. 10, line 51, "primarily form" should be --primarily from--.

Signed and Sealed this

Fourth Day of May, 1993

Attest:

MICHAEL K. KIRK

Attesting Officer

Acting Commissioner of Patents and Trademarks